(12) United States Patent
Song et al.

(10) Patent No.: US 10,773,316 B2
(45) Date of Patent: Sep. 15, 2020

(54) FIXING DEVICE FOR SECURING THIN-WALLED COMPONENT, AND METHOD OF MANUFACTURING ELASTIC MEMBER FOR USE IN THE FIXING DEVICE

(71) Applicant: HANWHA AEROSPACE CO., LTD., Changwon-si (KR)

(72) Inventors: SangMin Song, Changwon-si (KR); KwangHoon Han, Changwon-si (KR)

(73) Assignee: HANWHA AEROSPACE CO., LTD., Changwon-si (KR)

( * ) Notice: Subject to any disclaimer, the term of this patent is extended or adjusted under 35 U.S.C. 154(b) by 17 days.

(21) Appl. No.: 15/884,964

(22) Filed: Jan. 31, 2018

(65) Prior Publication Data
US 2018/0361488 A1 Dec. 20, 2018

(30) Foreign Application Priority Data
Jun. 15, 2017 (KR) .................. 10-2017-0075810

(51) Int. Cl.
| | |
|---|---|
| *B23B 31/20* | (2006.01) |
| *B23B 31/40* | (2006.01) |
| *B23B 31/16* | (2006.01) |
| *B29C 45/26* | (2006.01) |
| *B29C 45/14* | (2006.01) |
| *B29C 39/10* | (2006.01) |
| *B29C 33/00* | (2006.01) |

(Continued)

(52) U.S. Cl.
CPC ........ *B23B 31/16* (2013.01); *B23B 31/16275* (2013.01); *B23B 31/402* (2013.01); *B29C 33/0011* (2013.01); *B29C 33/12* (2013.01); *B29C 33/30* (2013.01); *B29C 39/10* (2013.01); *B29C 45/14065* (2013.01); *B29C 45/2616* (2013.01); *B23B 2215/64* (2013.01); *B23B 2226/61* (2013.01); *B23B 2231/34* (2013.01); *B29K 2075/00* (2013.01)

(58) Field of Classification Search
CPC . B23B 31/16; B23B 2231/34; B23B 2215/64; B23B 31/402; B23B 31/16275; B23B 31/305; B23B 31/4013; B23B 31/32; B23B 2260/032; B23Q 3/065; B25B 5/065

See application file for complete search history.

(56) References Cited

U.S. PATENT DOCUMENTS

| | | | | |
|---|---|---|---|---|
| 3,510,082 | A * | 5/1970 | Williams ............. | B65H 75/243 242/571.2 |
| 4,781,233 | A * | 11/1988 | Williams ................ | B23B 31/16 157/16 |

(Continued)

*Primary Examiner* — Sunil K Singh
*Assistant Examiner* — Paul M Janeski
(74) *Attorney, Agent, or Firm* — Sughrue Mion, PLLC

(57) ABSTRACT

A fixing device for securing a thin-walled component according to an embodiment includes: a support; a pressing portion provided on the support and including: a pressure generator located at a center of the support; and a plurality of pressure transmitters arranged around the pressure generator and extending in a radial direction of the thin-walled component; and a plurality of elastic members connected to the plurality of pressure transmitters, wherein the plurality of pressure transmitters are configured to move the plurality of elastic members in the radial direction.

18 Claims, 6 Drawing Sheets

(51) Int. Cl.
*B29C 33/12* (2006.01)
*B29C 33/30* (2006.01)
*B29K 75/00* (2006.01)

(56) References Cited

U.S. PATENT DOCUMENTS

| | | |
|---|---|---|
| 8,851,438 B2 | 10/2014 | Marshall |
| 9,085,057 B2 | 7/2015 | Marshall et al. |
| 2010/0164187 A1 | 7/2010 | Geng |
| 2014/0283368 A1 | 9/2014 | Geng |

* cited by examiner

FIXING DEVICE FOR SECURING THIN-WALLED COMPONENT, AND METHOD OF MANUFACTURING ELASTIC MEMBER FOR USE IN THE FIXING DEVICE

CROSS-REFERENCE TO THE RELATED APPLICATION

This application claims priority from Korean Patent Application No. 10-2017-0075810, filed on Jun. 15, 2017, in the Korean Intellectual Property Office, the disclosure of which is incorporated herein by reference in its entirety.

BACKGROUND

1. Field

Apparatuses and methods consistent with exemplary embodiments relate to a fixing device for securing a thin-walled component and a method of manufacturing an elastic member for use in the fixing device.

2. Description of the Related Art

It is not easy to machine a thin-walled component such as an engine casing because the thin-walled component is formed of a material such as a heat-resistant alloy, and the thin-walled component has to be formed with high accuracy in order to be connected to other elements of the final product. Accordingly, even when the thin-walled component is formed by using casting or the like, typically, a surface of the thin-walled component has to be machined with high accuracy. To this end, it is necessary to fix the thin-walled component for the machining process. However, once the thin-walled component is fixed by a fixing device during the machining process, the thin-walled component may be deformed due to the contact by the fixing device, or machining accuracy may be reduced due to vibration occurring during the machining process.

SUMMARY

One or more exemplary embodiments include a fixing device for securing a thin-walled component for the machining process and a method of manufacturing an elastic member used in the fixing device to fix the thin-walled component.

Additional aspects of the disclosure will be set forth in part in the description which follows and, in part, will be apparent from the description, or may be learned by practice of the presented exemplary embodiments.

According to an aspect of an exemplary embodiment, there is provided a fixing device for securing a thin-walled component including: a support; a pressing portion located on the support; and a plurality of elastic members connected to the pressing portion, wherein the pressing portion includes a pressure generator located at a center of the support and a plurality of pressure transmitters radially arranged around the pressure generator, wherein the plurality of pressure transmitters are connected to the plurality of elastic members, and positions of the plurality of elastic members are changed by pressure transmitted by the plurality of pressure transmitters.

The fixing device may further include an upper plate and a lower plate, each having a ring shape, respectively located over and under the plurality of elastic members, wherein the upper plate includes a plurality of first guide grooves extending from an outer edge of the upper plate toward a center of the upper plate, and the lower plate includes a plurality of second guide grooves extending from an outer edge of the lower plate toward a center of the lower plate.

Each of the plurality of elastic members may include guides respectively coupled to a top surface and a bottom surface of the plurality of elastic members, wherein the guides are located in the plurality of first guide grooves and the plurality of second guide grooves, respectively.

First nut plates respectively coupled to the guides may be embedded in each of the plurality of elastic members.

Each of the plurality of elastic members may include a connector coupled to an inner surface of each of the plurality of elastic members, wherein, from among the plurality of pressure transmitters, the connector is coupled to a pressure transmitter corresponding to the connector.

A second nut plate coupled to the connector may be embedded in each of the plurality of elastic members.

A gap may exist between the plurality of elastic members, wherein a size of the gap is increased or reduced as positions of the plurality of elastic members are changed.

According to an aspect of another exemplary embodiment, there is provided a method of manufacturing an elastic member of the fixing device including: placing a mold on a thin-walled component; manufacturing each of the elastic members by filling a space between the mold and the thin-walled component with a melted resin including urethane and then curing the melted resin; and separating each of the elastic members from the mold and the thin-walled component, wherein the mold includes: a main body having a cylindrical shape; a first limiter formed along an edge of a first end of the main body and protruding in a direction perpendicular to a longitudinal direction of the main body; a second limiter formed along an edge of a second end of the main body and protruding in a direction perpendicular to the longitudinal direction of the main body, wherein the second end of the main body is opposite to the first end of the main body; and first nut plates respectively coupled to the first limiter and the second limiter, wherein when the elastic members are separated from the mold and the thin-walled component, the first nut plates are separated from the first limiter and the second limiter and are respectively embedded in the elastic members.

The first nut plates may be respectively located on a surface facing the second limiter from among a top surface and a bottom surface of the first limiter and a surface facing the first limiter from among a top surface and a bottom surface of the second limiter.

The method may further include respectively coupling guides to the first nut plates.

The mold may further include: a plurality of partition walls, located on an outer surface of the main body and between the first limiter and the second limiter, and arranged along a circumferential surface of the main body such that adjacent partition walls among the plurality of partition walls are spaced apart from each other by a predetermined interval; and second nut plates each located between two adjacent partition walls from among the plurality of partition walls and coupled to the outer surface of the main body, wherein when the elastic members are separated from the mold and the thin-walled component, the second nut plates are separated from the main body and are respectively embedded in the elastic members.

The method may further include coupling a connector to each of the second nut plates.

The mold may further include a plurality of partition walls contacting the first limiter and the second limiter, located on an outer surface of the main body, and arranged along a circumferential surface of the main body such that adjacent partition walls among the plurality of partition walls are spaced apart from each other by a predetermined interval, wherein the plurality of partition walls contact an inner surface of the thin-walled component so as to divide a space between the mold and the thin-walled component into a plurality of spaces, and the plurality of elastic members are formed so as to be separated from one another between the plurality of partition walls.

The thin-walled component may include at least one hole, wherein the at least one hole is sealed by a pair of sealing plates respectively located on both side surfaces of the thin-walled component, wherein the pair of sealing plates are respectively closely attached to both side surfaces of the thin-walled component by a bolt passing through the pair of sealing plates and a nut engaged with the bolt to conform to shapes of both side surfaces of the thin-walled component.

According to an aspect of another exemplary embodiment, there is provided a fixing device for securing a thin-walled component, the fixing device including: a support; a pressing portion provided on the support and including: a pressure generator located at a center of the support; and a plurality of pressure transmitters arranged around the pressure generator and extending in a radial direction of the thin-walled component; and a plurality of elastic members connected to the plurality of pressure transmitters, wherein the plurality of pressure transmitters are configured to move the plurality of elastic members in the radial direction.

The fixing device may further include: an upper plate having a first ring shape and provided on a first surface of each of the plurality of elastic members; and a lower plate having a second ring shape and provided on a second surface opposite to the first surface of the plurality of elastic members. The upper plate includes a plurality of first guide grooves extending from an outer edge of the upper plate toward a center of the upper plate, and the lower plate includes a plurality of second guide grooves extending from an outer edge of the lower plate toward a center of the lower plate.

Each of the plurality of elastic members may include: first guides coupled to the first surface of each of the plurality of elastic members; and second guides coupled to the second surface of each of the plurality of elastic members. The first guides and the second guides are provided in the plurality of first guide grooves and the plurality of second guide grooves, respectively.

Each of the plurality of elastic members may include first nut plates coupled to the first and second guides and embedded in each of the plurality of elastic members.

A length of each of the first guide grooves and each of the second guide grooves in the radial direction is greater than a length of each of the first and second guides in the radial direction. The first and second guides are configured to move along the first guide groove and the second guide groove in the radial direction.

Each of the plurality of elastic members may include a connector coupled to an inner surface of each of the plurality of elastic members. The connector is coupled to a pressure transmitter from among the plurality of pressure transmitters.

Each of the plurality of elastic members may include a second nut plate coupled to the connector and embedded in each of the plurality of elastic members.

A gap may exist between the plurality of elastic members. A size of the gap is increased or reduced as positions of the plurality of elastic members are changed.

According to an aspect of another exemplary embodiment, there is provided a method of manufacturing an elastic member of the fixing device described above, the method including: placing a mold on a thin-walled component; filling a space between the mold and the thin-walled component with a melted resin including urethane; curing the melted resin between the mold and the thin-walled component thereby forming the elastic member of the fixing device; and separating the elastic member from the mold and the thin-walled component. The mold may include: a main body having a cylindrical shape; a first limiter formed along an edge of a first end of the main body and protruding in the radial direction from the main body; a second limiter formed along an edge of a second end of the main body and protruding in of the radial direction from the main body, wherein the second end of the main body is opposite to the first end of the main body in a longitudinal direction of the main body; and first nut plates coupled to the first limiter and the second limiter. In response to the elastic member being separated from the mold and the thin-walled component, the first nut plates may be separated from the first limiter and the second limiter and are respectively embedded in the elastic member.

The first nut plates may include: first top nut plates located on a surface of the first limiter facing the second limiter; and first bottom nut plates located on a surface of the second limiter facing the first limiter.

The method may further include coupling guides to the first nut plates of the elastic member.

The mold may further include: a plurality of partition walls provided on an outer surface of the main body, connecting the first limiter and the second limiter, and arranged along a circumferential surface of the main body such that adjacent partition walls among the plurality of partition walls are spaced apart from each other by a predetermined interval along a circumferential direction of the main body; and second nut plates, each of second nut plates located between the adjacent partition walls from among the plurality of partition walls and coupled to the outer surface of the main body. In response to the elastic member being separated from the mold and the thin-walled component, the second nut plates may be separated from the main body and are embedded in the elastic member.

The method may further include coupling a connector to each of the second nut plates.

The mold may further include a plurality of partition walls contacting the first limiter and the second limiter, located on an outer surface of the main body, and arranged along a circumferential surface of the main body such that adjacent partition walls among the plurality of partition walls are spaced apart from each other by a predetermined interval in a circumferential direction of the main body. The plurality of partition walls may contact an inner surface of the thin-walled component so as to divide a space between the mold and the thin-walled component into a plurality of spaces along the circumferential direction. The plurality of elastic members may be formed so as to be separated from one another between the plurality of partition walls.

The thin-walled component may include at least one hole. The at least one hole may be sealed by a pair of sealing plates respectively located on opposite side surfaces of the thin-walled component. The pair of sealing plates may be respectively attached to the opposite side surfaces of the thin-walled component by a bolt passing through the pair of sealing plates and a nut engaged with the bolt to conform to shapes of the opposite side surfaces of the thin-walled component.

According to an aspect of another exemplary embodiment, there is provided a fixing device for securing a thin-walled component in a machining process, the fixing device including: a lower plate; a pressing portion provided on the lower plate and including a plurality of pressure transmitters arranged along a circumferential direction of the thin-walled component; and an elastic member having a shape corresponding to an inner surface of the thin-walled component and attached to the plurality of pressure transmitters. The plurality of pressure transmitters may be configured to move in a radial direction of the thin-walled component to move the plurality of elastic members in the radial direction of the thin-walled component.

The fixing device may further include an upper plate having a first ring shape. The elastic member may be provided between the lower plate and the upper plate.

The upper plate may include a plurality of first guide grooves extending from an outer edge of the upper plate toward a center of the upper plate. The lower plate may include a plurality of second guide grooves extending from an outer edge of the lower plate toward a center of the lower plate.

The elastic member may include: first guides coupled to a first surface of elastic member; and second guides coupled to a second surface opposite to the first surface of elastic member. The first guides and the second guides may be provided in the plurality of first guide grooves and the plurality of second guide grooves, respectively.

The elastic member may include a plurality of connectors arranged along the circumferential direction and coupled to an inner surface of the elastic member The plurality of connectors may be coupled to the plurality of pressure transmitters.

BRIEF DESCRIPTION OF THE DRAWINGS

The above and/or other aspects of the disclosure will become apparent and more readily appreciated from the following description of the exemplary embodiments, taken in conjunction with the accompanying drawings in which.

DETAILED DESCRIPTION

Figure 1:
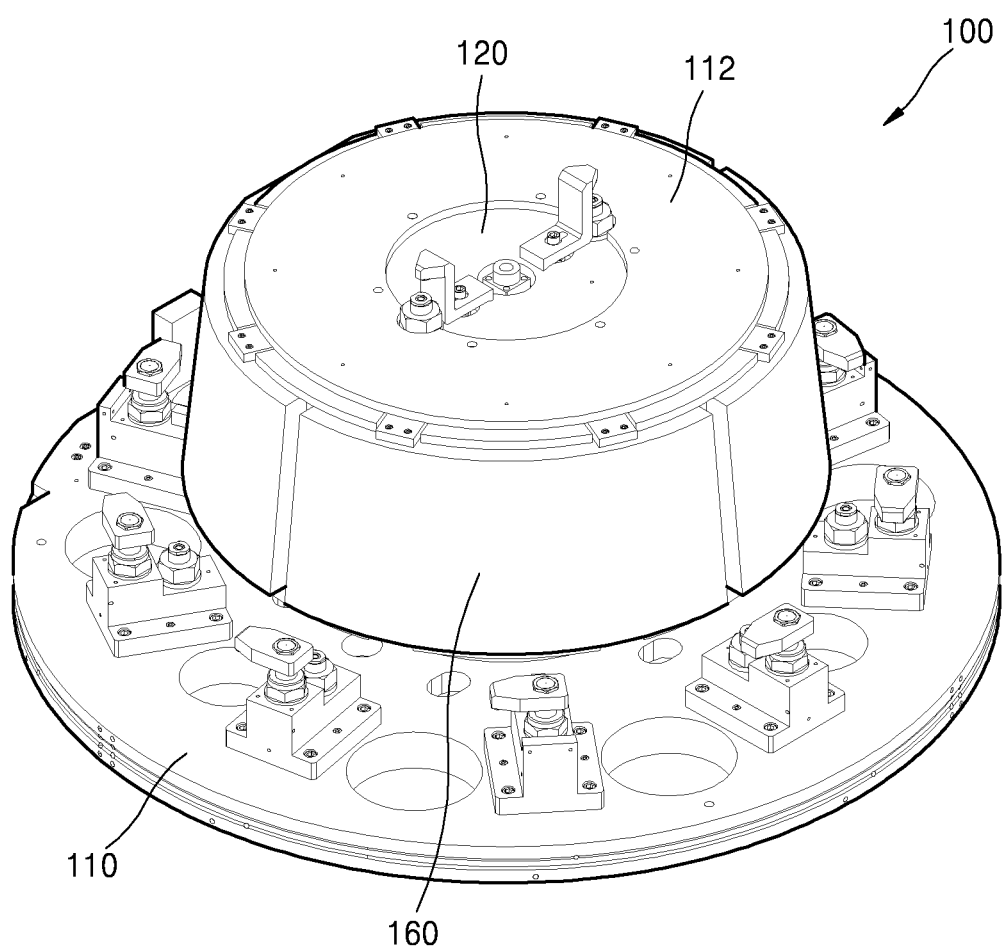
FIG. 1 is a perspective view of a fixing device for a thin-walled component according to an exemplary embodiment.

As the present disclosure allows for various changes and numerous exemplary embodiments, the exemplary embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the present disclosure are encompassed in the present disclosure. In the description of the present disclosure, certain detailed explanations of related art are omitted when it is deemed that they may unnecessarily obscure the essence of the present disclosure.

It will be understood that, although the terms first, second, etc. may be used herein to describe various elements, these elements should not be limited by these terms. These terms are only used to distinguish one element from another.

The terminology used herein is for the purpose of describing exemplary embodiments only and is not intended to be limiting of the exemplary embodiments. As used herein, the singular forms "a", "an", and "the", are intended to include the plural forms as well, unless the context clearly indicates otherwise. Each element shown in the drawings may be exaggerated, omitted or schematically drawn for the purpose of convenience and clarity. In addition, the size of each element does not utterly reflect an actual size.

When an element is referred to as being 'on' or 'under' another element, the element may be directly on or under the other element or may be indirectly on or under the other element with intervening elements therebetween, and the terms 'on' and 'under' are used only for describing a direction in the drawings.

Reference will now be made in detail to exemplary embodiments, examples of which are illustrated in the accompanying drawings. In the drawings, the same or corresponding elements are denoted by the same reference numerals, and a repeated explanation thereof will not be given.

Figure 2A:
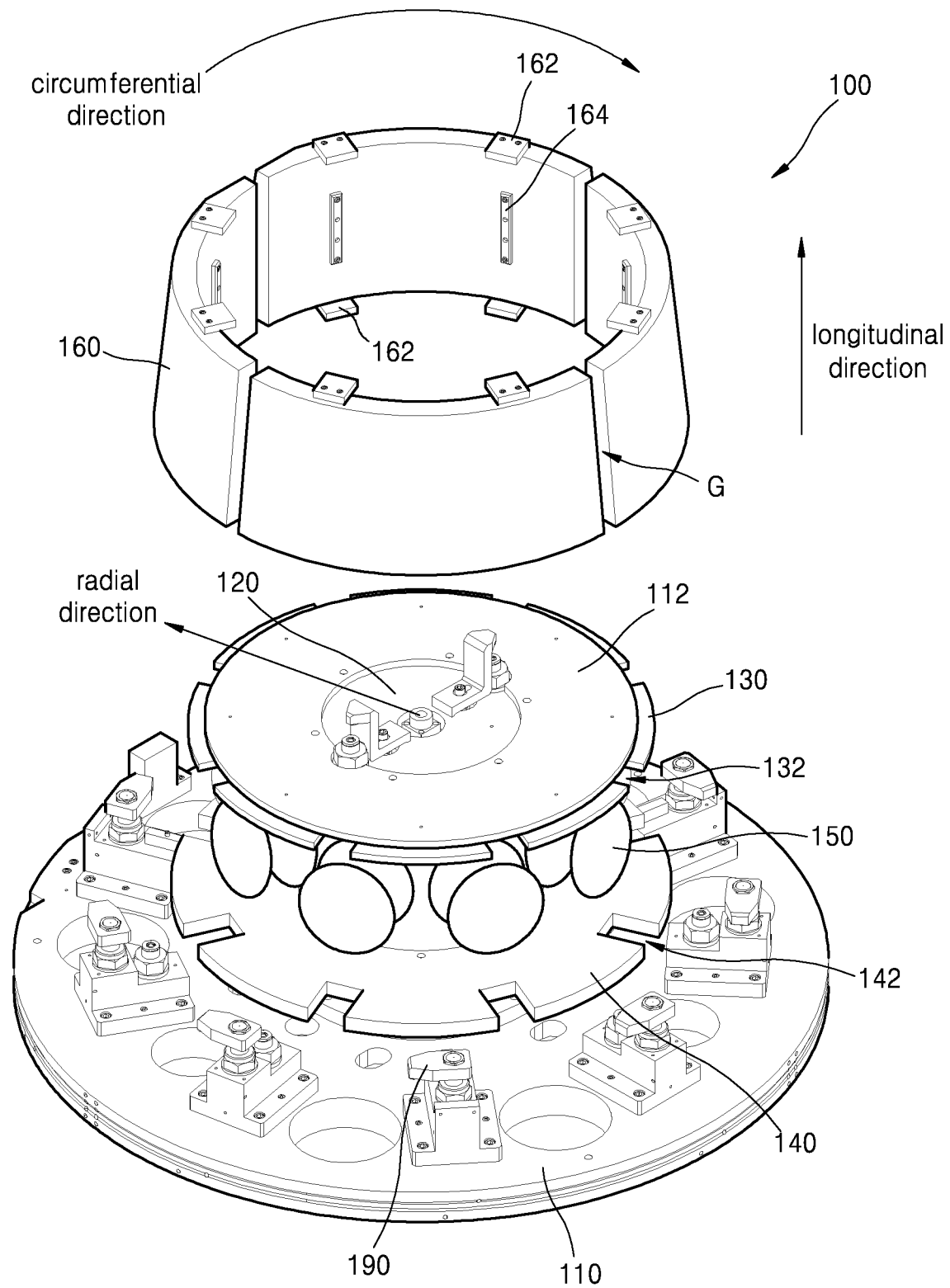
FIG. 2A is an exploded perspective view of the fixing device of FIG. 1 according to an exemplary embodiment.
Figure 2B:
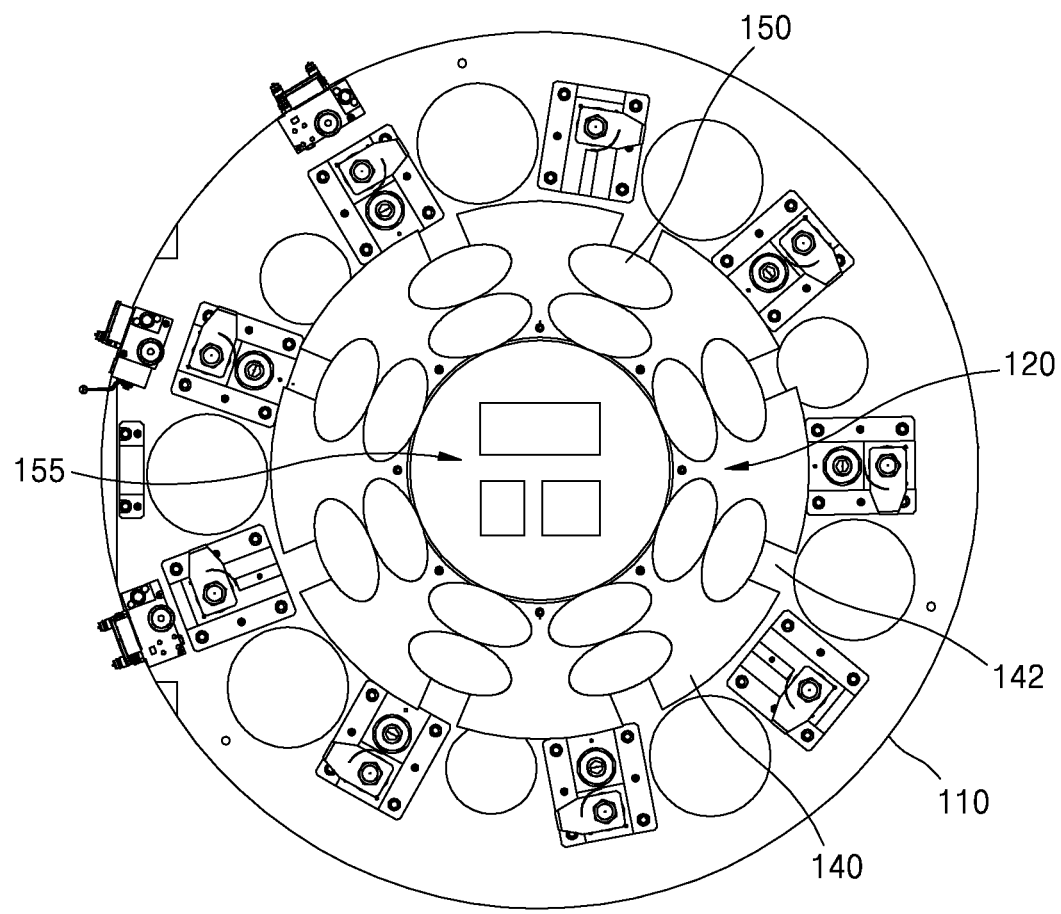
FIG. 2B is a top view illustrating a pressure portion of the fixing device 100 of FIG. 1 according to an exemplary embodiment.

FIG. 1 is a perspective view of a fixing device 100 for securing a thin-walled component according to an exemplary embodiment. FIG. 2A is an exploded perspective view illustrating a state where an elastic member 160 of the fixing device 100 of FIG. 1 is separated. FIG. 2B is a top view illustrating a pressure portion 120 of the fixing device 100 of FIG. 1 according to an exemplary embodiment Referring to FIGS. 1, 2A and 2B, the fixing device 100 according to an exemplary embodiment may include a support 110, a pressing portion 120 located on the support 110, and the elastic member 160 connected to the pressing portion 120. The fixing device 100 may further include an upper plate 130 and a lower plate 140 respectively located over and under the elastic member 160, and a cover 112 covering the top of the pressing portion 120.

The support 110 may support a thin-walled component 300 (FIG. 4)) to be machined, and may include a fixing unit 190 for holding the thin-walled component 300 in a fixed position. The fixing unit 190 may be, for example, a clamp. The thin-walled component 300 may have, but is not limited to, a cylindrical or dome shape with a thin wall.

The pressing portion 120 may include a pressure generator 155 and a pressure transmitter 150 as shown in FIG. 2B. The pressure generator 155 may include various elements such as a motor, a cylinder, and a compressor. When the pressure transmitter 150 transmits pressure generated by the pressure generator 155 to the elastic member 160, a position of the elastic member 160 may be changed. For example, the pressure transmitter 150 may be, but is not limited to, a bellows cylinder.

The pressure generator 155 may be located at the center of the support 110, and a plurality of the pressure transmitters 150 may be arranged around the pressure generator 155. For example, the plurality of pressure transmitters 150 may be circumferentially arranged around the pressure generator 155 such that adjacent pressure transmitters 150 are spaced apart from each other by a predetermined interval as shown in FIG. 2A.

The elastic member 160 may include urethane. The elastic member 160 may conform to an inner surface of the thin-walled component 300 to be machined. Because the elastic member 160 is closely attached to the inner surface of the thin-walled component 300 to be machined and absorbs vibration occurring when the thin-walled component 300 is machined, machining accuracy may be improved.

Instead of a single elastic member 160, a plurality of the elastic members 160 may be provided, and may be arranged such that adjacent elastic members 160 are spaced apart from each other by a predetermined interval along the circumferential direction of the thin-walled component 300. The plurality of elastic members 160 may collectively form a cylindrical shape surrounding the plurality of the pressure transmitters 150. With the plurality of elastic members 160, there may be a gap G between adjacent elastic members 160 of the plurality of elastic members 160. When positions of the plurality of elastic members 160 are changed by the pressure transmitters 150, the gap G between the adjacent elastic members 160 may be increased or reduced based on the changed positions.

In detail, when lengths of the pressure transmitters 150 increase in a radial direction of the thin-walled component 300, the plurality of elastic members 160 move outward and are more closely attached to the inner surface of the thin-walled component 300, and the gap G increases. In contrast, when lengths of the pressure transmitters 150 decrease in the radial direction of the thin-walled component 300, the corresponding gap G between the adjacent elastic members 160 decreases and the plurality of elastic members 160 are radially separated from the thin-walled component 300, thereby making it possible to easily separate or couple the thin-walled component 300 from or to the fixing device 100.

Each of the elastic members 160 may be located between the upper plate 130 and the lower plate 140 along an axial direction of the thin-walled component 300. The elastic member 160 may include a plurality of guides 162 where each guide 162 is coupled to a top surface or a bottom surface of the elastic member 160, and a connector 164 coupled to an inner surface of the elastic member 160.

The upper plate 130 may have a ring shape, and may cover the top surface of the elastic member 160. Also, the upper plate 130 may include a first guide groove 132 into which one of the guides 162 coupled to the top surface of the elastic member 160 is inserted.

The first guide groove 132 may extend from an outer edge of the upper plate 130 toward the center of the upper plate 130. In an exemplary embodiment, the upper plate 130 including a plurality of the first guide grooves 132 may have a saw-toothed wheel shape. That is, the upper plate 130 includes at least one first guide groove 132. A length of the first guide groove 132 along the radial direction extending from the outer edge of the upper plate 130 toward the center of the upper plate 130 is greater than a length of each of the guides 162 such that each of the guides 162 is accommodated within the first guide groove.

The lower plate 140 has a ring shape, and supports the bottom surface of the elastic member 160. The lower plate 140 may include a second guide groove 142 into which one of the guides 162 coupled to the bottom surface of the elastic member 160 is inserted, in a similar manner to the upper plate 130. A length of the second guide groove 142 that extends from an outer edge of the lower plate 140 toward the center of the lower plate 140 along the radial direction may be greater than a length of each of the guides 162 along the radial direction. Also, the second guide groove 142 may vertically (i.e., along the axial direction of the thin-walled component 300 or along the axial direction of the elastic member 160 as shown in FIG. 2A) overlap the first guide groove 132, but is not limited thereto.

As such, because the guides 162, each of which is coupled to the top surface or the bottom surface of the elastic member 160, are located in the first guide groove 132 of the upper plate 130 or the second guide groove 142 of the lower plate 140, when positions of the plurality of elastic members 160 are changed due to the pressure transmitters 150, the guides 162 which are coupled to the top surface or the bottom surface of the elastic members 160 are moved along the first guide groove 132 and the second guide groove 142 in the radial direction. Accordingly, the elastic members 160 may be stably moved along the radial direction without being detached.

The connectors 164 may be coupled the corresponding pressure transmitters 150, respectively. Accordingly, positions of the elastic members 160 along the radial direction may be rapidly changed when lengths of the pressure transmitters 150 are changed (i.e., when the pressure transmitters 150 moved along the radial direction).

Figure 3:
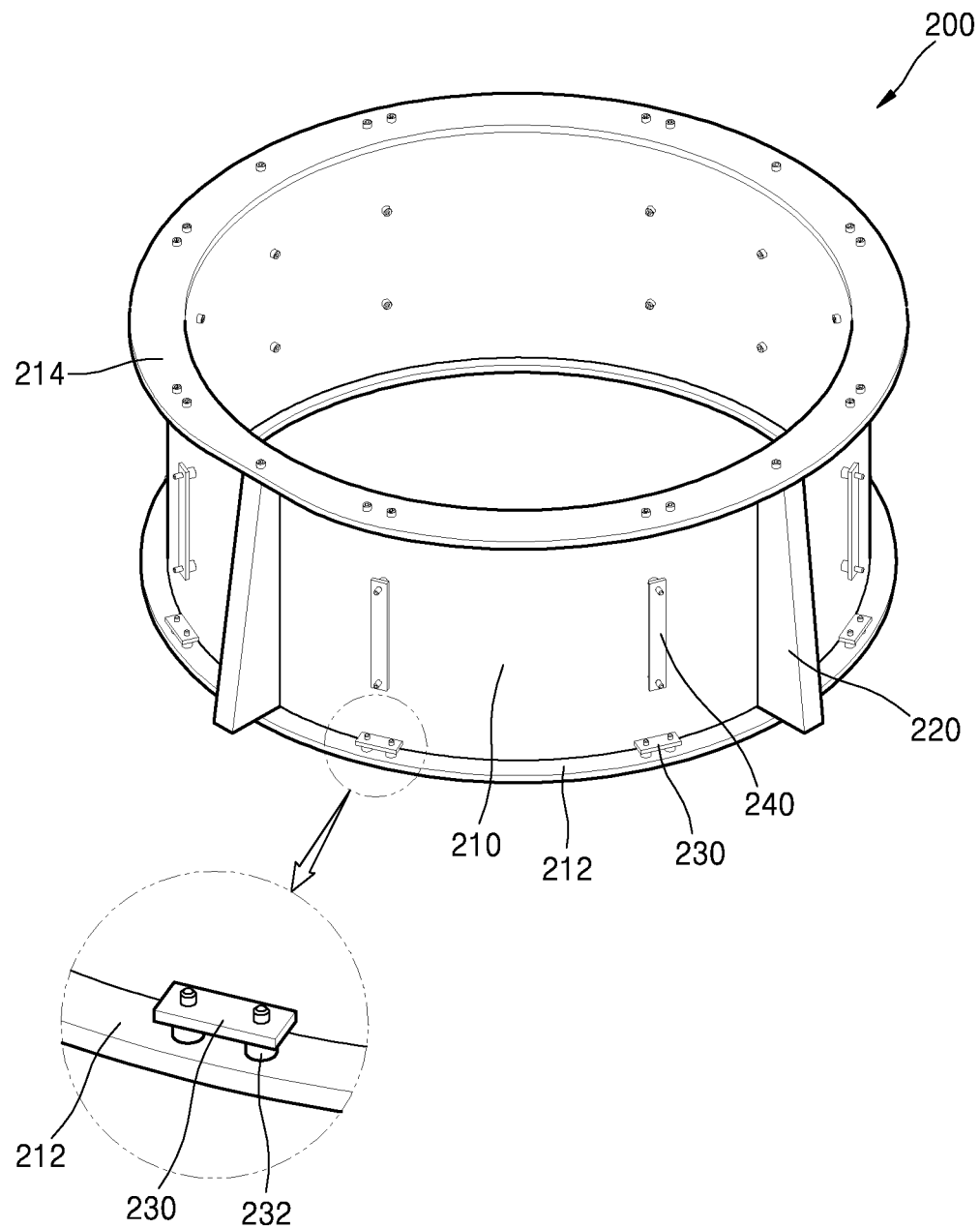
FIG. 3 is a perspective view of a mold for forming an elastic member of the fixing device of FIG. 1 according to an exemplary embodiment.

FIG. 3 is a perspective view of a mold 200 for forming an elastic member 160 of a fixing device 100 of FIG. 1 according to an exemplary embodiment.

Referring to FIG. 3, the mold 200 according to an exemplary embodiment may include a main body 210, a first limiter 212 formed at an edge (along the axial direction of the elastic member 160) of a first end of the main body 210, a second limiter 214 formed on an edge (along the axial direction of the elastic member 160) of a second end opposite to the first end of the main body 210, and a plurality of partition walls 220 located on an outer surface of the main body 210 so as to be disposed between the first limiter 212 and the second limiter 214 along the circumferential direction of the elastic member 160.

The main body 210 may have a cylindrical shape. However, exemplary embodiments are not limited thereto, and the main body 210 may have any of various other shapes (e.g., a conical shape or a polygon shape) according to a shape of the elastic member 160 formed by using the mold 200. For example, according to the conical shape of the plurality of elastic member s 160 as shown in FIG. 1, the main body 210 may have the corresponding conical shape.

The first limiter 212 may be formed along the edge of the first end of the main body 210 and may protrude outward in the radial direction from the main body 210. That is, the first limiter 212 may have a ring shape. Likewise, the second limiter 214 may be continuously formed along the edge of the second end of the main body 210 and may protrude outward in the radial direction from the main body 210. For example, the first limiter 212 and the second limiter 214 may protrude in a direction perpendicular to a longitudinal direction (or an axial direction) of the main body 210.

The plurality of partition walls 220 may be located on the outer surface of the main body 210 and may be arranged along the main body 210 such that adjacent partition walls 220 are spaced apart from each other by a predetermined interval in the circumferential direction of the main body 210. Also, the plurality of partition walls 220 may extend in the longitudinal direction (or the axial direction) of the main body 210 and may connect the first limiter 212 and the second limiter 214 along the longitudinal direction (or the axial direction) so as to be fixedly located between the first limiter 212 and the second limiter 214.

A plurality of first nut plates 230 may be coupled to the first limiter 212 and the second limiter 214 along the circumferential direction as shown in FIG. 3. In detail, the plurality of first nut plates 230 may be located on a surface facing the second limiter 214 from among a top surface and a bottom surface of the first limiter 212 and a surface facing the first limiter 212 from among a top surface and a bottom surface of the second limiter 214.

Each of the plurality of first nut plates 230 may be fixed to the first and second limiters via bolts that pass through the first limiter 212 or the second limiter 214. The first nut plates 230 located on the first limiter 212 and the first nut plates 230 located on the second limiter 214 may overlap each other to face each other, respectively. However, exemplary embodiments are not limited thereto, and the first nut plates 230 located on the first limiter 212 and the first nut plates 230 located on the second limiter 214 may be offset from each other along the circumferential direction of the main body 210.

The first nut plates 230 may be spaced apart from the first limiter 212 or the second limiter 214 along the longitudinal direction due to spacers 232. For example, the spacers 232 may be integrally formed with the first nut plates 230, and bolts for fixing the first nut plates 230 may pass through the first limiter 212 or the second limiter 214 and may be coupled to the spacers 232.

A second nut plate 240 is located on the outer surface of the main body 210 and between two adjacent partition walls 220. The second nut plate 240 may be extending in a direction parallel to the longitudinal direction of the main body 210. A plurality of second nut plates 240 may be located between two adjacent partition walls 220, and each of the plurality of second nut plates 240 may be spaced apart from the main body 210 due to a spacer (similar to the spacers 232 described above) and may be fixedly attached to the main body 231 due to a bolt that passes through the main body 210, in a similar manner to that of the first nut plates 230.

Figure 4:
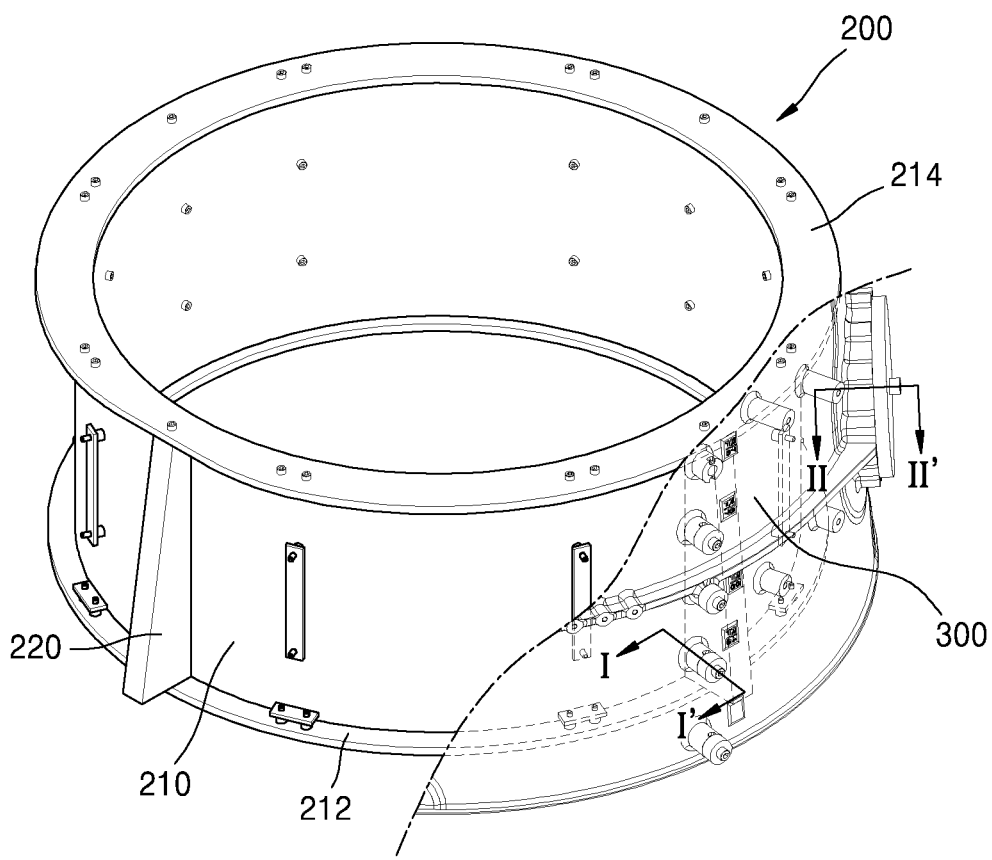
FIG. 4 is a perspective view illustrating a state where the mold of FIG. 3 and the thin-walled component are coupled to each other to form the elastic member of the fixing device of FIG. 1 according to an exemplary embodiment.
Figure 5:
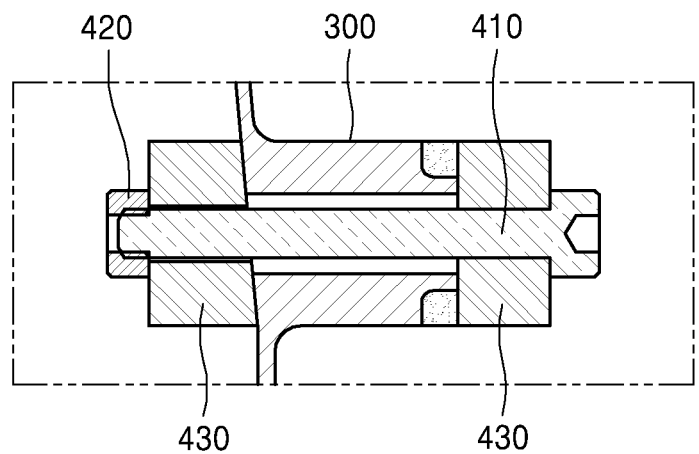
FIG. 5 is a cross-sectional view taken along line I-I' of FIG. 4 according to an exemplary embodiment.
Figure 6:
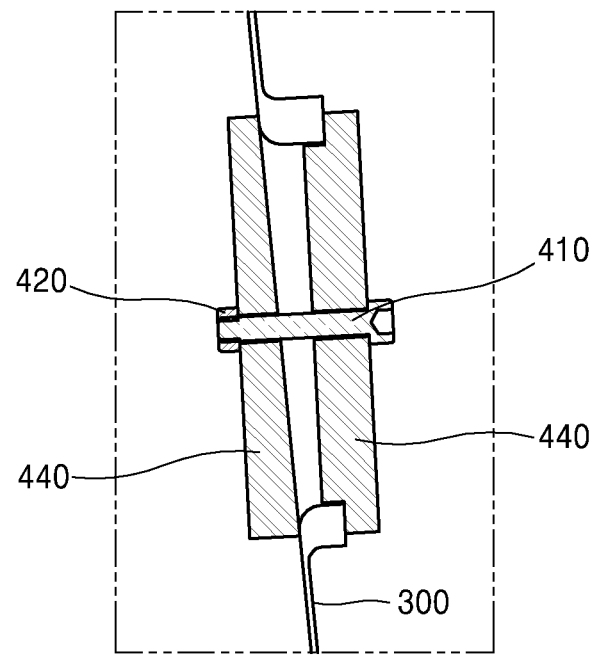
FIG. 6 is a cross-sectional view taken along line II-II' of FIG. 4; according to an exemplary embodiment
Figure 7:
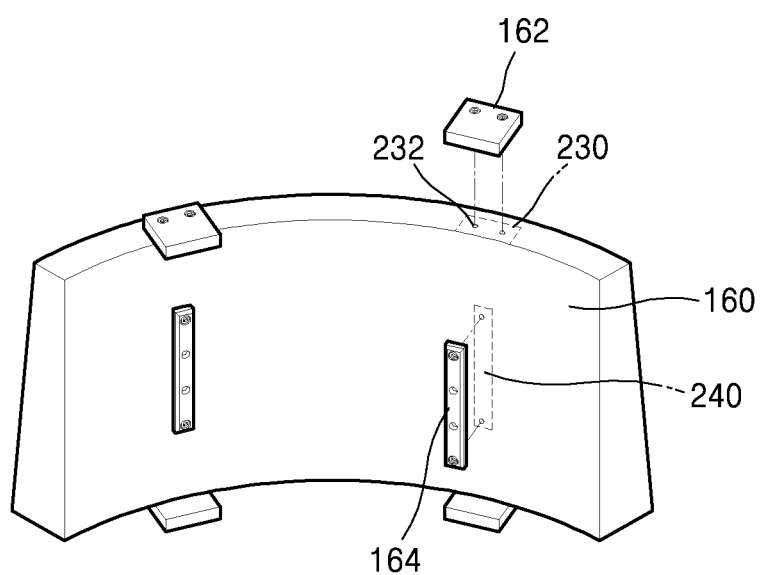
FIG. 7 is a perspective view of the elastic member of the fixing device of FIG. 1 according to an exemplary embodiment.

FIG. 4 is a perspective view illustrating a state where the mold 200 of FIG. 3 and a thin-walled component 300 are coupled to each other to form the elastic member 160 of the fixing device 100 of FIG. 1. FIG. 5 is a cross-sectional view taken along line I-I' of FIG. 4. FIG. 6 is a cross-sectional view taken along line II-II' of FIG. 4. FIG. 7 is a perspective view of the elastic member 160 of the fixing device 100 of FIG. 1 according to an exemplary embodiment.

A method of manufacturing the elastic member 160 will now be described with reference to FIG. 4 and FIGS. 5 through 7.

First, the thin-walled component 300 is placed on the mold 20 as shown in FIG. 4. FIG. 4 illustrates only a part of the thin-walled component 300 to more clearly describe a state where the mold 200 and the thin-walled component 300 are coupled to each other.

The thin-walled component 300 may be a component, or a duplicate (a model) thereof, of which a surface is to be machined by using the fixing device 100 of FIG. 1. The thin-walled component 300 may have, for example, a cylindrical shape including a hollow center portion, a dome shape, or a shape including a hollow portion in which a width thereof decreases in one direction (i.e., a cone shape), and the mold 200 may be inserted into the hollow center portion of the thin-walled component 300. In this case, at least the partition walls 220 of the mold 200 may contact an inner surface of the thin-walled component 300.

In a state where the mold 200 is inserted into the hollow center portion of the thin-walled component 300, a melted resin is injected between the mold 200 and the thin-walled component 300. In more detail, the mold 200 and the thin-walled component 300 of FIG. 4 may be overturned, and then a melted resin may be injected between the first limiter 212 and the thin-walled component 300.

The melted resin may include urethane. After the melted resin including urethane is cured, the elastic member 160 is formed.

The second limiter 214 may contact the inner surface of the thin-walled component 300. Accordingly, when the melted resin is filled between the first limiter 212 and the second limiter 214, the elastic members 160 (see FIG. 7) may be formed in a limited area between the first limiter 212 and the second limiter 214.

Also, because the partition walls 220 divides a space between the mold 200 and the thin-walled component 300 into a plurality of spaces, the elastic members 160 may be formed so as to be separated from each other between the partition walls 220. Also, because the thin-walled component 300 to be machined is used as a part in the molding process, the formed elastic members 160 (see FIG. 7) may conform to the inner surface of the thin-walled component 300.

The thin-walled component 300 may include at least one hole. In order to use the thin-walled component 300 as a part of the molding process for forming the elastic members 160 (see FIG. 7), and to prevent a leakage of the melted resin, the hole formed in the thin-walled component 300 must be sealed.

In FIG. 4, the thin-walled component 300 includes different holes, and holes located in at least an area in which the melted resin is filled are sealed, which will be described in more detail with reference to FIGS. 5 and 6.

FIG. 5 illustrates a state where a first hole formed in the thin-walled component 300 is sealed by using a bolt 410 and a nut 420. In detail, the first hole may be sealed by respectively locating a pair of first sealing plates 430 on both side surfaces of the thin-walled component 300 and closely attaching the pair of first sealing plates 430 to both side surfaces of the thin-walled component 300 by using the nut 420 and the bolt 410 that passes through the pair of first sealing plates 430.

The first sealing plates 430 may be formed of a soft material. For example, the first sealing plates 430 may include urethane. Accordingly, as the bolt 410 and the nut 420 are tightly engaged with each other, shapes of the first sealing plates 430 may be changed and the first sealing plates 430 may be closely attached to conform to both side surfaces of the thin-walled component 300. Accordingly, even when a portion in which the first hole is formed has a curved surface, because it is not necessary to machine the first sealing plates 430 such that the first sealing plates 430 conform to the curved surface, the first hole may be easily sealed.

Also, although not shown, a spherical washer may be further located between the nut 420 and one first sealing plate 430 adjacent to the nut 420 from among the pair of first sealing plates 430. When the first hole is formed in an inclined surface of the thin-walled component 300, the spherical washer may compensate for the inclination of the inclined surface. Accordingly, additional machining for matching the first sealing plate 430 to the inclined surface may be omitted.

FIG. 6 illustrates a state where a second hole formed in the thin-walled component 300 is sealed by using the bolt 410 and the nut 420. The second hole may be larger than the first hole. The second hole may be sealed by respectively locating a pair of second sealing plates 440 on both side surfaces of the thin-walled component 300 and closely attaching the pair of second sealing plates 440 to both side surfaces of the thin-walled component 300 by using the bolt 410 and the nut 420.

The second sealing plates 440 may be formed of a material that is the same as that of the first sealing plates 430 (see FIG. 5). Accordingly, as the bolt 410 and the nut 420 are tightly engaged with each other, shapes of the second sealing plates 440 may be changed and the second sealing plates 440 may be closely attached to both side surfaces of the thin-walled component 300. Accordingly, even when a portion in which the second hole is formed has a curved surface, the second hole may be sealed without machining the second sealing plates 440.

When the second hole is larger than the first hole, the second sealing plates 440 may be deformed when the bolt 410 and the nut 420 are tightly engaged with each other, and thus, the second hole may not be completely sealed. Accordingly, in order to prevent this problem, a pressure-distributing plate (not shown) for preventing the deformation of the second sealing plates 440 may be further located between the nut 420 and the second sealing plates 440. The pressure-distributing plate may have a size equal to or greater than that of the second hole and less than that of the second sealing plates 430. For example, the pressure-distributing plate may be a washer having a flat shape.

The elastic members 160, having been formed, may be separated from the mold 200 and the thin-walled component 300. In this case, the first nut plates 230 and the second nut plates 240 included in the mold 200 may be separated from the mold 200 and may be embedded in the elastic members 160, respectively, as shown in FIG. 7.

In more detail, surfaces of spacers 232 connected to the first nut plates 230 may be exposed on a top surface or a bottom surface of each of the elastic members 160, and the guides 162 may be coupled through bolts or the like to the spacers 232 which are exposed. Likewise, surfaces of spacers (not shown) connected to the second nut plates 240 may be exposed on an inner surface of the elastic member 160, and the connectors 164 may be coupled to the spacers.

Although the mold 200 is located in the thin-walled component 300 and the elastic members 160 are formed so as to conform to an inner surface of the thin-walled component 300 in the above exemplary embodiments, the present disclosure is not limited thereto. That is, the thin-walled component 300 may be located in the mold 200, and the elastic members 160 may be formed so as to conform to the inner surface of the thin-walled component 300 and may absorb vibration when the inner surface of the thin-walled component 300 is machined, to thereby improve machining accuracy. To this end, the first limiter 212, the second limiter 214, and the partition walls 220 of the mold 200 may be formed on an inner surface of the main body 210.

As described above, according to the one or more exemplary embodiments, because vibration occurring when a thin-walled component is machined is absorbed, machining accuracy of the thin-walled component may be improved. However, the scope of the present disclosure is not limited by the effect.

While exemplary embodiments have been described with reference to the figures, it will be understood by one of ordinary skill in the art that various changes in form and details may be made therein without departing from the spirit and scope of the inventive concept as defined by the following claims.

What is claimed is:

1. A fixing device for securing a thin-walled component, the fixing device comprising:
    a support;
    a pressing portion provided on the support, the pressing portion comprising:
        a pressure generator located at a center of the support; and
        a plurality of pressure transmitters arranged around the pressure generator and extending in a radial direction of the thin-walled component; and
    a plurality of elastic members connected to the plurality of pressure transmitters,
    wherein the plurality of pressure transmitters are configured to move the plurality of elastic members in the radial direction,
    wherein each of the plurality of elastic members comprises a connector coupled to an inner surface of each of the plurality of elastic members, and
    wherein the connector is coupled to a pressure transmitter from among the plurality of pressure transmitters.

2. The fixing device of claim 1 further comprising:
    an upper plate having a first ring shape and provided on a first surface of each of the plurality of elastic members; and
    a lower plate having a second ring shape and provided on a second surface opposite to the first surface of the plurality of elastic members,
    wherein the upper plate comprises a plurality of first guide grooves extending from an outer edge of the upper plate toward a center of the upper plate, and
    wherein the lower plate comprises a plurality of second guide grooves extending from an outer edge of the lower plate toward a center of the lower plate.

3. The fixing device of claim 2, wherein each of the plurality of elastic members comprises:
    first guides coupled to the first surface of each of the plurality of elastic members; and
    second guides coupled to the second surface of each of the plurality of elastic members, and
    wherein the first guides and the second guides are provided in the plurality of first guide grooves and the plurality of second guide grooves, respectively.

4. The fixing device of claim 3, wherein each of the plurality of elastic members comprises first nut plates coupled to the first and second guides and embedded in each of the plurality of elastic members.

5. The fixing device of claim 3, wherein a length of each of the first guide grooves and each of the second guide grooves in the radial direction is greater than a length of each of the first and second guides in the radial direction, and
    wherein the first and second guides are configured to move along the first guide groove and the second guide groove in the radial direction.

6. The fixing device of claim 1, wherein each of the plurality of elastic members comprises a second nut plate coupled to the connector and embedded in each of the plurality of elastic members.

7. The fixing device of claim 1, wherein a gap exists between the plurality of elastic members, and
    wherein a size of the gap is increased or reduced as positions of the plurality of elastic members are changed.

8. A method of manufacturing an elastic member of the fixing device of claim 1, the method comprising:
placing a mold on a thin-walled component;
filling a space between the mold and the thin-walled component with a melted resin comprising urethane;
curing the melted resin between the mold and the thin-walled component thereby forming the elastic member of the fixing device; and
separating the elastic member from the mold and the thin-walled component,
wherein the mold comprises:
a main body having a cylindrical shape;
a first limiter formed along an edge of a first end of the main body and protruding in the radial direction from the main body;
a second limiter formed along an edge of a second end of the main body and protruding in of the radial direction from the main body, wherein the second end of the main body is opposite to the first end of the main body in a longitudinal direction of the main body; and
first nut plates coupled to the first limiter and the second limiter, and
wherein in response to the elastic member being separated from the mold and the thin-walled component, the first nut plates are separated from the first limiter and the second limiter and are respectively embedded in the elastic member.

9. The method of claim 8, wherein the first nut plates comprises:
first top nut plates located on a surface of the first limiter facing the second limiter; and
first bottom nut plates located on a surface of the second limiter facing the first limiter.

10. The method of claim 8, further comprising coupling guides to the first nut plates of the elastic member.

11. The method of claim 8, wherein the mold further comprises:
a plurality of partition walls provided on an outer surface of the main body, connecting the first limiter and the second limiter, and arranged along a circumferential surface of the main body such that adjacent partition walls among the plurality of partition walls are spaced apart from each other by a predetermined interval along a circumferential direction of the main body; and
second nut plates, each of second nut plates located between the adjacent partition walls from among the plurality of partition walls and coupled to the outer surface of the main body,
wherein in response to the elastic member being separated from the mold and the thin-walled component, the second nut plates are separated from the main body and are embedded in the elastic member.

12. The method of claim 11, further comprising coupling a connector to each of the second nut plates.

13. The method of claim 8, wherein the mold further comprises a plurality of partition walls contacting the first limiter and the second limiter, located on an outer surface of the main body, and arranged along a circumferential surface of the main body such that adjacent partition walls among the plurality of partition walls are spaced apart from each other by a predetermined interval in a circumferential direction of the main body,
wherein the plurality of partition walls contact an inner surface of the thin-walled component so as to divide a space between the mold and the thin-walled component into a plurality of spaces along the circumferential direction, and
wherein a plurality of elastic members are formed so as to be separated from one another between the plurality of partition walls.

14. The method of claim 8, wherein the thin-walled component comprises at least one hole,
wherein the at least one hole is sealed by a pair of sealing plates respectively located on opposite side surfaces of the thin-walled component, and
wherein the pair of sealing plates are respectively attached to the opposite side surfaces of the thin-walled component by a bolt passing through the pair of sealing plates and a nut engaged with the bolt to conform to shapes of the opposite side surfaces of the thin-walled component.

15. A fixing device for securing a thin-walled component in a machining process, the fixing device comprising:
a lower plate;
a pressing portion provided on the lower plate, the pressing portion comprising a plurality of pressure transmitters arranged along a circumferential direction of the thin-walled component; and
an elastic member having a shape corresponding to an inner surface of the thin-walled component and attached to the plurality of pressure transmitters,
wherein the plurality of pressure transmitters are configured to move in a radial direction of the thin-walled component to move a plurality of elastic members in the radial direction of the thin-walled component,
wherein the elastic member comprises a plurality of connectors arranged along the circumferential direction and coupled to an inner surface of the elastic member, and
wherein, the plurality of connectors are coupled to the plurality of pressure transmitters.

16. The fixing device of claim 15 further comprising an upper plate having a first ring shape, and
wherein the elastic member is provided between the lower plate and the upper plate.

17. The fixing device of claim 16, wherein the upper plate comprises a plurality of first guide grooves extending from an outer edge of the upper plate toward a center of the upper plate, and
wherein the lower plate comprises a plurality of second guide grooves extending from an outer edge of the lower plate toward a center of the lower plate.

18. The fixing device of claim 17, wherein the elastic member comprises:
first guides coupled to a first surface of elastic member; and
second guides coupled to a second surface opposite to the first surface of elastic member, and
wherein the first guides and the second guides are provided in the plurality of first guide grooves and the plurality of second guide grooves, respectively.

* * * * *